(12) United States Patent
Hooker et al.

(10) Patent No.: US 12,542,466 B2
(45) Date of Patent: Feb. 3, 2026

(54) ACTUATOR WITH POTTING COMPOUND (71) Applicant: Schaeffler Technologies AG & Co. KG, Herzogenaurach (DE)

(72) Inventors: Craig Hooker, Indian Land, SC (US); Bartholomew Briggs, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 285 days.

(21) Appl. No.: 18/201,423

(22) Filed: May 24, 2023

(65) Prior Publication Data

US 2023/0387746 A1 Nov. 30, 2023

Related U.S. Application Data (60) Provisional application No. 63/346,356, filed on May 27, 2022.

(51) Int. Cl.
| | |
|---|---|
| *H02K 5/10* | (2006.01) |
| *H02K 5/15* | (2006.01) |
| *H02K 5/22* | (2006.01) |
| *H02K 11/21* | (2016.01) |
| *H02K 11/215* | (2016.01) |
| *H02K 11/33* | (2016.01) |

(52) U.S. Cl.
CPC ........... *H02K 5/10* (2013.01); *H02K 5/15* (2013.01); *H02K 5/225* (2013.01); *H02K 11/21* (2016.01); *H02K 11/215* (2016.01); *H02K 11/33* (2016.01); *H02K 2211/03* (2013.01)

(58) Field of Classification Search
CPC ............ H02K 5/10; H02K 5/12; H02K 5/132; H02K 5/15; H02K 11/21; H02K 11/215; H02K 11/30; H02K 11/33; H02K 2211/03; H02K 5/22; H02K 5/225

See application file for complete search history.

(56) References Cited

U.S. PATENT DOCUMENTS

| | | | |
|---|---|---|---|
| 3,924,555 A | 12/1975 | Napolitano | |
| 6,310,455 B1 * | 10/2001 | Siraky | H02K 11/33 318/560 |
| 10,625,831 B2 | 4/2020 | Venables et al. | |
| 2005/0253577 A1 | 11/2005 | Affaticati et al. | |
| 2008/0164866 A1 * | 7/2008 | Steinich | G01D 5/08 324/207.2 |

(Continued)

FOREIGN PATENT DOCUMENTS

| | | | | |
|---|---|---|---|---|
| CN | 111313646 A | * | 6/2020 | ............. H02K 29/08 |
| JP | 2005080445 A | | 3/2005 | |

(Continued)

OTHER PUBLICATIONS

Gong, Machine Translation of CN111313646, Jun. 2020 (Year: 2020).*

(Continued)

*Primary Examiner* — Eric Johnson
(74) *Attorney, Agent, or Firm* — Volpe Koenig (57) ABSTRACT

An actuator includes a housing defining a cavity. The actuator further includes a hub disposed in the cavity. The actuator further includes a controller disposed in the cavity and supported by the hub. The actuator further includes potting compound surrounding the controller within the cavity.

16 Claims, 6 Drawing Sheets

(56) References Cited

U.S. PATENT DOCUMENTS

| | | | |
|---|---|---|---|
| 2011/0120073 A1 | 5/2011 | Flanary | |
| 2011/0201238 A1 | 8/2011 | Rott et al. | |
| 2015/0028236 A1 | 1/2015 | Dolenti et al. | |
| 2015/0096436 A1 | 4/2015 | Venables et al. | |
| 2016/0121978 A1 | 5/2016 | Venables et al. | |
| 2017/0170701 A1* | 6/2017 | Haensch | H02K 11/30 |
| 2017/0279328 A1* | 9/2017 | Albee | H02K 7/14 |
| 2018/0166942 A1 | 6/2018 | Aoi et al. | |
| 2018/0198351 A1 | 7/2018 | Akutsu et al. | |
| 2019/0323473 A1* | 10/2019 | Namuduri | H02K 11/0094 |
| 2024/0200651 A1* | 6/2024 | Mettem | H02K 7/083 |

FOREIGN PATENT DOCUMENTS

| | | |
|---|---|---|
| KR | 20170084336 A | 7/2017 |
| KR | 20190127788 A | 11/2019 |
| WO | 2019021094 A1 | 1/2019 |
| WO | 2022101597 A1 | 5/2022 |
| WO | WO-2023170267 A1 * 9/2023 ............. H02K 29/08 |

OTHER PUBLICATIONS

Teimel, Machine Translation of WO2023170267, Sep. 2023 (Year: 2023).*

* cited by examiner

ACTUATOR WITH POTTING COMPOUND

CROSS-REFERENCE TO RELATED APPLICATIONS

This application claims the benefit of U.S. Provisional Patent Application No. 63/346,356, filed May 27, 2022, the disclosure of which is incorporated in its entirety by reference herein.

TECHNICAL FIELD

The present disclosure relates generally to an actuator, and more specifically to an actuator including a controller surrounded by a potting compound.

BACKGROUND

An actuator may include a controller disposed within a housing. Potting compound can be inserted into the housing to cover the controller. Potting compound can protect the controller from adverse environmental conditions, e.g., liquid, debris, vibrational effects, thermal effects, etc. Due to relative movement between other components in the actuator and the housing, it is desirable to have alternative designs and configurations to reduce undesired relative movement between a housing and the other component of an actuator.

SUMMARY

According to one embodiment, an actuator includes a housing defining a cavity. The actuator further includes a hub disposed in the cavity. The actuator further includes a controller disposed in the cavity and supported by the hub. The actuator further includes potting compound surrounding the controller within the cavity.

In embodiments, the potting compound may fill the cavity around the controller.

In embodiments, the hub may include a first portion configured to radially constrain the hub in the cavity and a second portion radially spaced from the housing and supporting the controller. The potting compound may fill the cavity between the second portion and the housing. The potting compound may be configured to radially constrain the second portion in the cavity. The second portion may include a groove extending radially inward from an outer surface of the second portion. The potting compound may fill the groove. The potting compound may be configured to axially constrain the hub in the cavity via the groove. The potting compound may be configured to prevent movement of the hub relative to the housing.

In embodiments, the actuator may include a cable gland extending through an opening in the housing and a portion of a cable extending through the cable gland into the cavity. The potting compound may cover the cable gland and the portion of the cable in the cavity. The potting compound may be configured to seal the cable gland to the housing and the cable within the cavity. The potting compound may be configured to retain the portion of the cable in the cavity.

In embodiments, the actuator may include a shaft extending outwardly from the cavity. The potting compound may be spaced from the shaft. The actuator may include an encoder magnet supported by the shaft. The potting compound may be radially spaced from the encoder magnet. The potting compound may be axially spaced from the encoder magnet. The controller may include a sensor. The potting compound may cover the sensor, and the sensor may be configured to detect a position of the shaft through the potting compound.

In embodiments, the potting compound may be configured to adhere to the hub. In embodiments, the controller may include a plurality of circuit boards axially spaced from each other. The potting compound may fill the cavity between the circuit boards. In embodiments, the potting compound may be configured to seal the cavity around the controller.

A method, according to one exemplary embodiment of the disclosure, is provided for potting an actuator housing. The method includes inserting a circuit board having a sensor into the housing. The method further includes filling the housing with potting compound. The method further includes inserting a tool configured to direct potting compound away from a portion of the circuit board including the sensor. The method further includes removing the tool after curing the potting compound.

In embodiments, the tool may be configured to not adhere to the potting compound. In embodiments, a thickness of the potting compound covering the portion of the circuit board including the sensor may be less than a thickness of the potting compound covering the rest of the circuit board.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Some actuators may include a controller disposed in a housing. These actuators may further include a potting compound covering the controller within the housing. However, the potting compound may cover only a portion of the controller, e.g., due to clearances between the controller and the housing, thereby exposing the remaining portion of the controller to adverse environmental conditions. Additionally, undesired movement of the other components relative to the housing may result, e.g., from manufacturing tolerances. In this situation, components may be separated from the controller and/or the controller may be moved relative to the potting compound thereby deforming the potting compound. Such relative movement can prevent the actuator from operating in a desired manner.

Advantageously, an actuator, in one embodiment of the disclosure, includes a housing defining a cavity. A hub is disposed in the cavity. A controller is disposed in the cavity and supported by the hub. Potting compound surrounds the controller within the cavity. Surrounding the controller within the cavity protects the entire controller from adverse environmental conditions, which can increase a likelihood of the actuator operating in a desired manner. Additionally, the potting compound can adhere to additional components around the controller, which can decrease a likelihood of relative movement between the components and the controller or the housing.

With reference to FIGS. 1-5, an actuator 100 is generally shown. The actuator 100 includes a housing 102 and a plurality of components. The housing 102 houses the plurality of components of the actuator 100. The housing 102 may extend annularly about an axis A. The housing 102 includes a first end 104 and a second end 106 spaced from the first end 104 along an axis A. The housing 102 includes a wall 108 extending along the axis A from the first end 104 to the second end 106. Additionally, the wall 108 extends annularly about the axis A. The wall 108 defines a cavity 110 extending circumferentially about the axis A and axially along the axis A.

The wall 108 may include an opening 122 extending radially through the wall 108. The opening 122 may be designed, i.e., sized and shaped, to receive a cable 124. The cable 124 may include one or more wires configured to provide electricity to one or more components of the actuator 100, e.g., sensors 414a, 414b, motor 300, controller 400, etc. The cable 124 may extend through the opening 122 into the cavity 110. A cable gland 126 may be configured to seal the cable 124 to the housing 102 in the opening 122. The cable gland 126 may extend through the opening 122. For example, a portion of the cable gland 126 may be disposed in the cavity 110.

The actuator 100 includes a hub 352 disposed in the cavity 110. The hub 352 may extend annularly about the axis A. The hub 352 includes an outer surface 358 extending circumferentially about the axis A. The outer surface 358 includes a first portion 360 and a second portion 362. The first portion 360 of the outer surface 358 is disposed radially outward of the second portion 362. The first portion 360 engages the housing 102. For example, the first portion 360 may be non-rotatably connected to the housing 102, e.g., via a press-fit connection.

The second portion 362 is radially spaced from the housing 102. The second portion 362 may include a groove 364 extending circumferentially about the axis A. The groove 364 may extend radially inward from the second portion 362 towards the axis A. The groove 364 may be axially spaced from the first portion 360.

A controller 400 disposed within cavity 110 includes a plurality of circuit boards 412a, 412b, 412c and a plurality of supports 402 supporting the plurality of circuit boards 412a, 412b, 412c. The controller 400 may be disposed between two encoder magnets 368a, 368b supported by respective shafts 308, 154 rotatable about an axis of rotation. For example, the encoder magnet 368b may be non-rotatably connected to the shaft 154 and the encoder magnet 368a may be non-rotatably connected to the shaft 308. The encoder magnets 368a, 368b may be spaced from each other along the axis of rotation. The encoder magnets 368a, 368b may face each other, i.e., each face towards the controller 400. Each encoder magnet 368a, 368b has diametric polarity, i.e., poles spaced from each other diametrically across the respective encoder magnet 368a, 368b. The encoder magnets 368a, 368b may be arranged coaxially with the axis A.

The controller 400 may include a computer 416 and one or more sensors 414a, 414b supported by the circuit boards 412a, 412b, 412c. The sensors 414a, 414b may be angular position sensors. For example, each sensor 414a, 414b may be configured to detect an angular position of a respective encoder magnet 368a, 368b relative to the axis of rotation. The sensors 414a, 414b may be any suitable type of angular position sensor. For example, the sensors 414a, 414b may be a Hall effect sensor configured to output a unique angular position over 360° of rotation about the axis of rotation. In such an example, the Hall effect sensor can determine the angular position of the respective encoder magnet 368a, 368b based on detecting a position of the poles relative to the axis of rotation, e.g., according to known techniques.

The computer 416 includes a processor and a memory such as are known. The memory includes one or more forms of computer-readable media, and stores instructions executable by the processor for performing various operations, including as disclosed herein. The computer 416 is generally arranged for communications, e.g., via known wired and/or wireless mechanisms, with various components in the actuator 100, e.g., sensors 414a, 414b, the motor 300, etc., and/or with devices outside of the actuator 100.

The actuator 100 may include a plurality of supports 402 configured to support the circuit boards 412a, 412b, 412c. The supports 402 may be configured to maintain the sensors 414a, 414b within a predetermined range of the respective encoder magnet 368a, 368b. The predetermined range may be specified by a manufacturer of the sensor, e.g., based on empirical testing to determine a range in which the sensor output satisfies a specified measurement accuracy and/or precision.

Each support 402 may be mounted, e.g., via a press-fit connection, to the hub 352. For example, the hub 352 may have a plurality of recesses circumferentially spaced from each other about the axis A, and each support 402 may be press-fit into one respective recess. The supports 402 may be any suitable material, e.g., plastic.

The actuator 100 may include any suitable number of circuit boards. For example, the actuator 100 may include a plurality of circuit boards 412a, 412b 412c. In such an example, the circuit boards 412a, 412b 412c may be axially spaced from each other. That is, the supports 402 may be configured to support each circuit board 412*a*, 412*b* 412*c* and to axially space the circuit boards 412*a*, 412*b* 412*c* from each other.

The controller 400 may, for example, be programmed to detect, e.g., via the sensor, an angular position of the shaft 308 relative to the axis A. Additionally, or alternatively, the controller 400 may, for example, be programmed to update an angular position of the shaft 308. For example, the controller 400 may be programmed to actuate a motor, e.g., an electric motor such as a permanent magnet synchronous motor, to rotate about the axis A. In such an example, rotation of the motor may cause rotation of the shaft 308.

A potting compound 182 surrounds the controller 400 within the cavity 110. For example, the potting compound 182 may fill the cavity 110 around the controller 400. That is, the potting compound 182 may fill axial and radial spaces components of the controller 400 and components of the actuator 100. By filling the cavity 110 around the controller 400, the potting compound 182 can protect the controller 400, and specifically the circuit boards 412*a*, 412*b* 412*c* and components thereof, from debris and/or fluid if any should enter the cavity 110. Additionally, the potting compound 182 can provide thermal and vibration insulation to the controller 400. The potting compound 182 may be any suitable material, e.g., epoxy, urethane, silicone, etc.

Additionally, the potting compound 182 can contact the hub 352. The potting compound 182 may be configured to prevent movement of the hub 352 relative to the housing 102. For example, the potting compound 182 can fill a gap between the second portion 362 of the hub 352 and the wall 108. Filling the gap can assist in radially constraining the hub 352 relative to the housing 102. Further, the potting compound 182 can fill the groove 364, which can assist in axially constraining the hub 352, e.g., by preventing axial movement of the hub 352 absent sufficient sheer forces being applied to the potting compound 182 at the groove 364.

Additionally, or alternatively, the potting compound 182 may cover the cable gland 126 in the cavity 110, which can further assist in sealing the opening 122. The opening 122 may be disposed axially between the hub 352 and the shaft 154. Additionally, covering the cable gland 126 allows the potting compound 182 to adhere to the cable 124, which can assist in preventing the cable 124 from being removed from the cable gland 126, e.g., by being pulled along the axis R.

The potting compound 182 may be configured to be radially spaced from the encoder magnet 368*b*. Additionally, the potting compound 182 may be configured to be axially spaced from the encoder magnet 368*b*. For example, during a curing process, a tool may be inserted into the potting compound 182 that directs the potting compound 182 away from the axis A. The tool may be configured to not adhere to the potting compound 182 such that the tool can be removed from the potting compound 182 after curing without compromising the adherence of the potting compound 182 to the other components of the actuator 100.

After the potting compound 182 cures and the tool is removed, the potting compound 182 defines a recess 140. The recess 140 may be arranged coaxially with the axis A. The recess 140 may be configured to receive a portion of the shaft 154 that supports the encoder magnet 368*b*. In this embodiment, the shaft 154 can rotate freely, i.e., without contacting the potting compound 182, within the recess 140.

The potting compound 182 may cover the sensor 414*b*. The sensor 414*b* may be configured to detect the encoder magnet 368*b* through the potting compound 182. For example, an axial thickness of the potting compound 182 covering the sensor 414*b* may be controlled, e.g., via the tool, such that the potting compound 182 does not interfere with the sensor 414*b* detecting the encoder magnet 368*b*. The axial thickness of the potting compound 182 covering the sensor 414*b* is less than an axial thickness of the potting compound 182 covering the rest of the circuit boards 412*a*, 412*b*, 412*c*.

Figure 1:
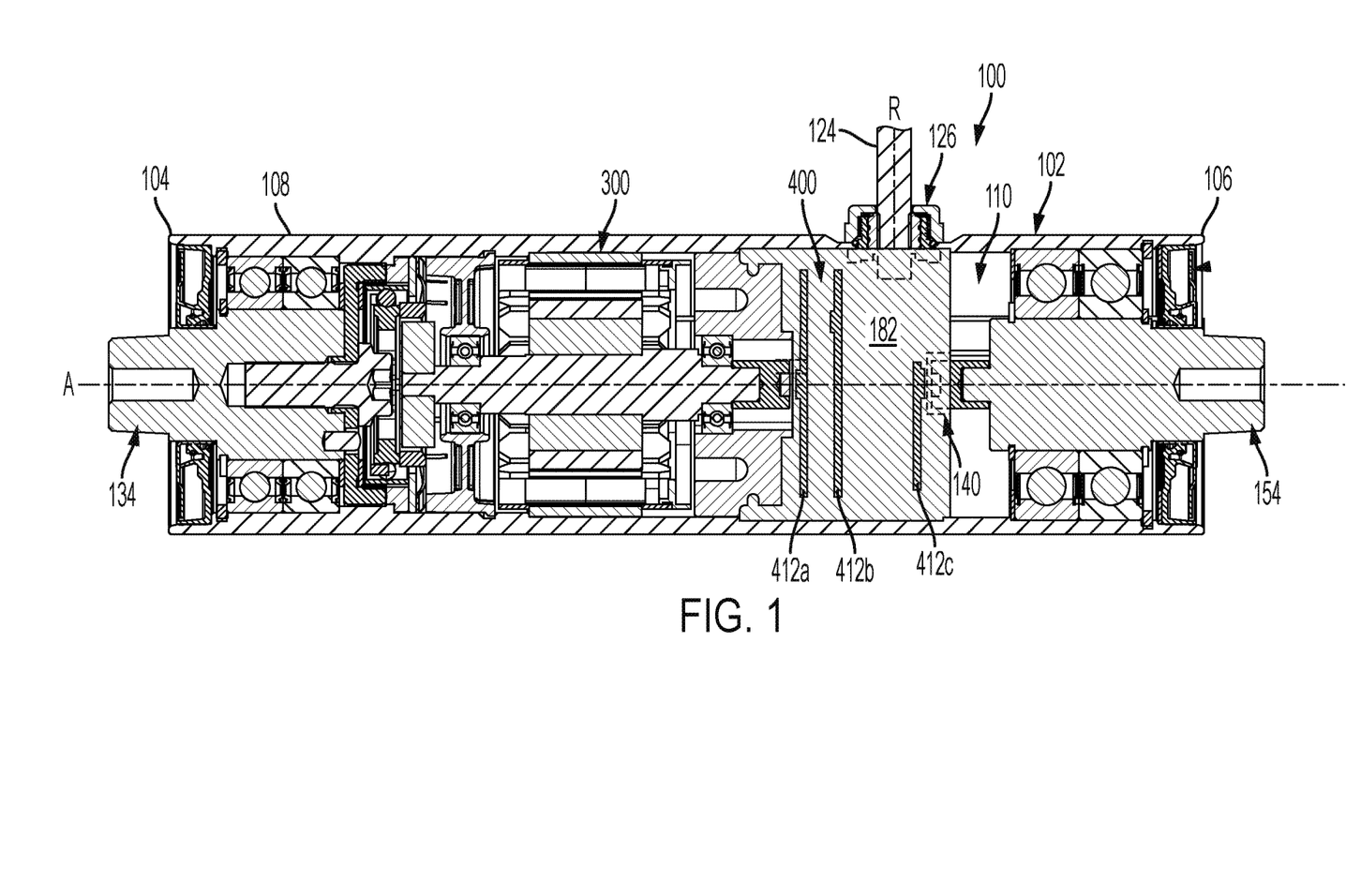
FIG. 1 shows a cross-sectional view along an axis of an actuator according to an embodiment of the disclosure.
Figure 2:
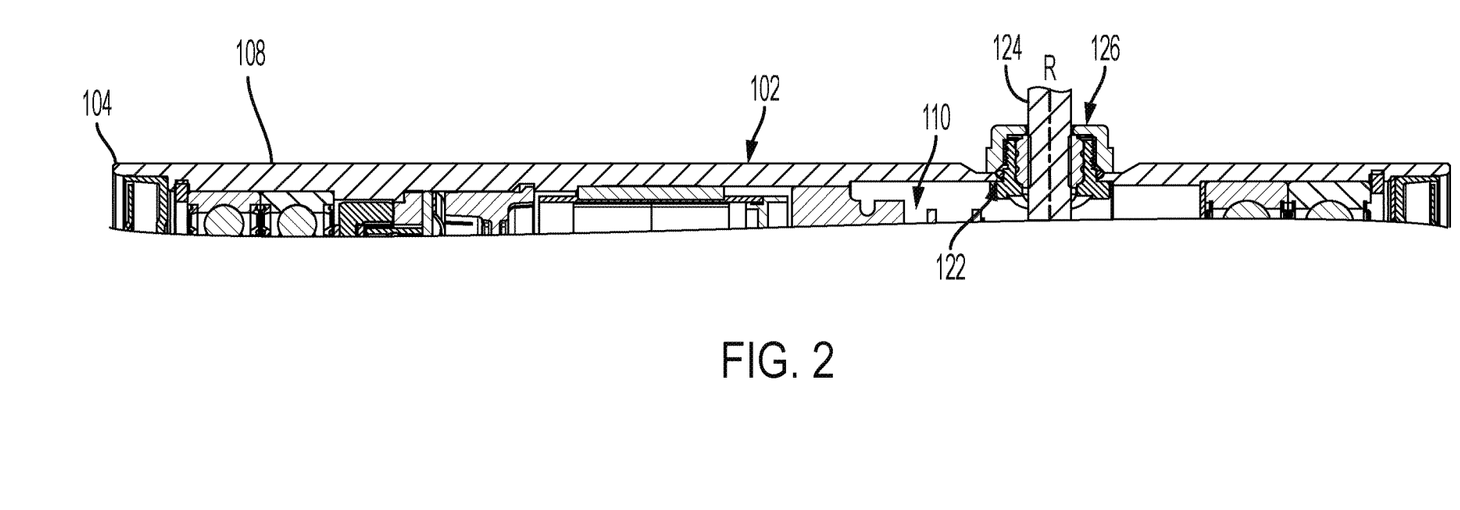
FIG. 2 shows a magnified cross-sectional view of a housing of the actuator shown in FIG. 1.
Figure 3:
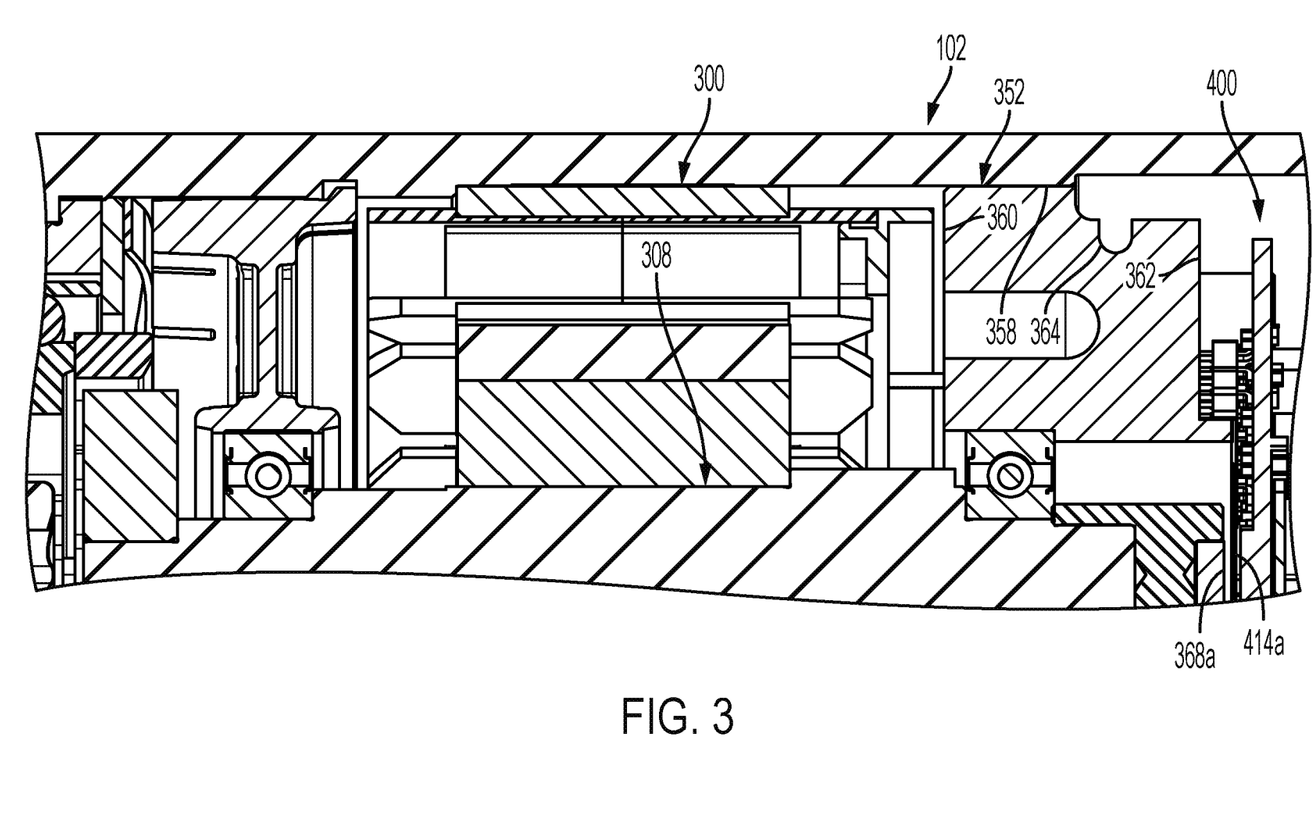
FIG. 3 shows a magnified cross-sectional view of another portion of the actuator shown in FIG. 1.
Figure 4:
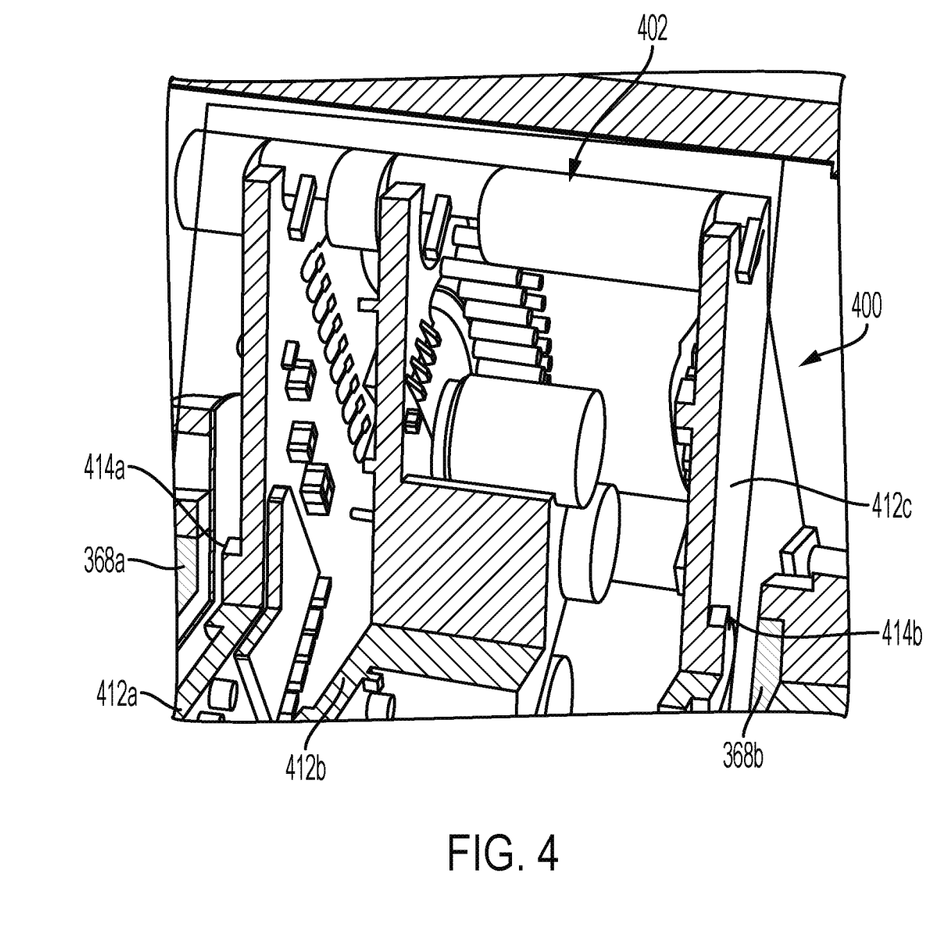
FIG. 4 shows a magnified cross-sectional view of another portion of the actuator FIG. 1.
Figure 5:
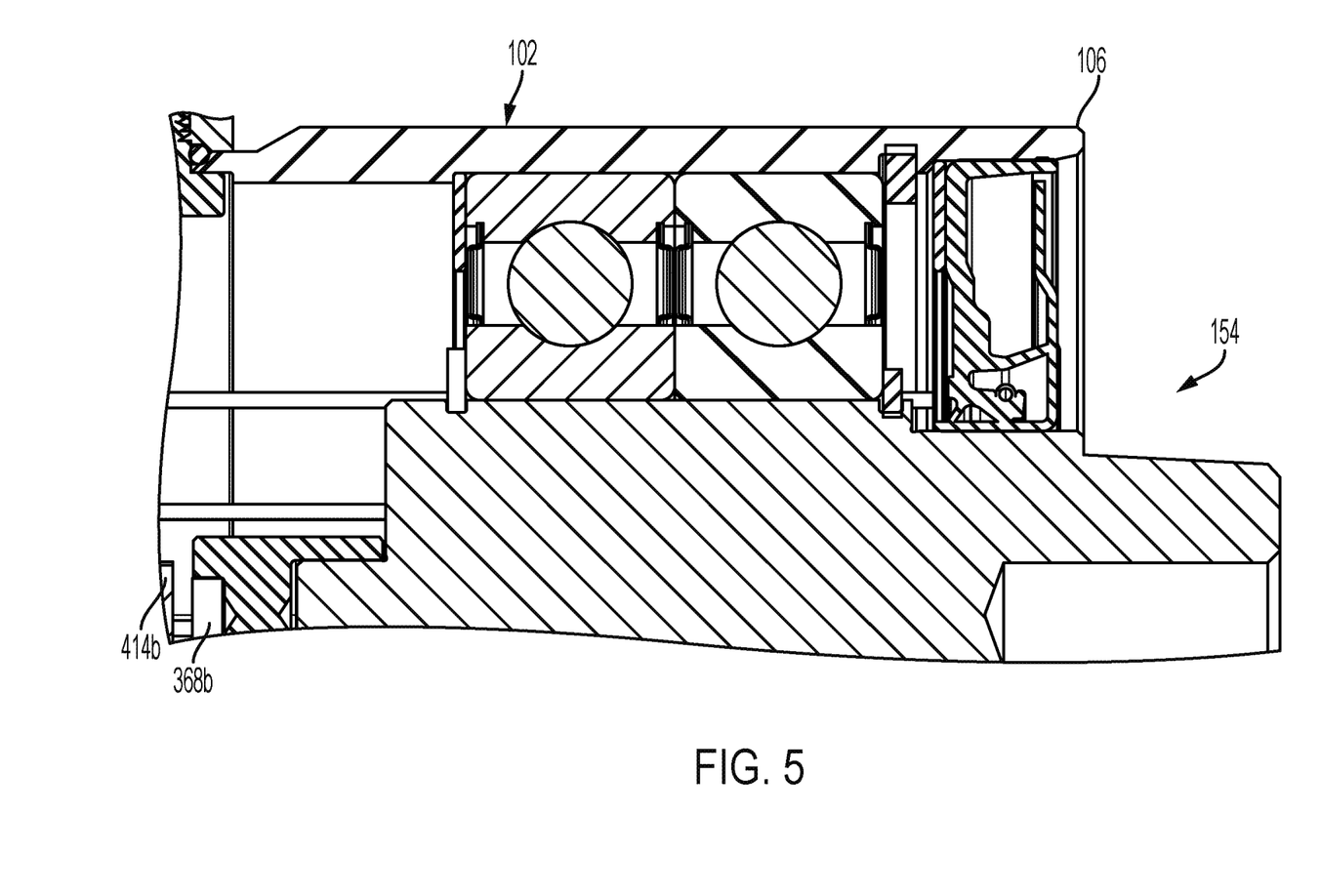
FIG. 5 shows a magnified cross-sectional view of another portion of the actuator shown in FIG. 1.
Figure 6:
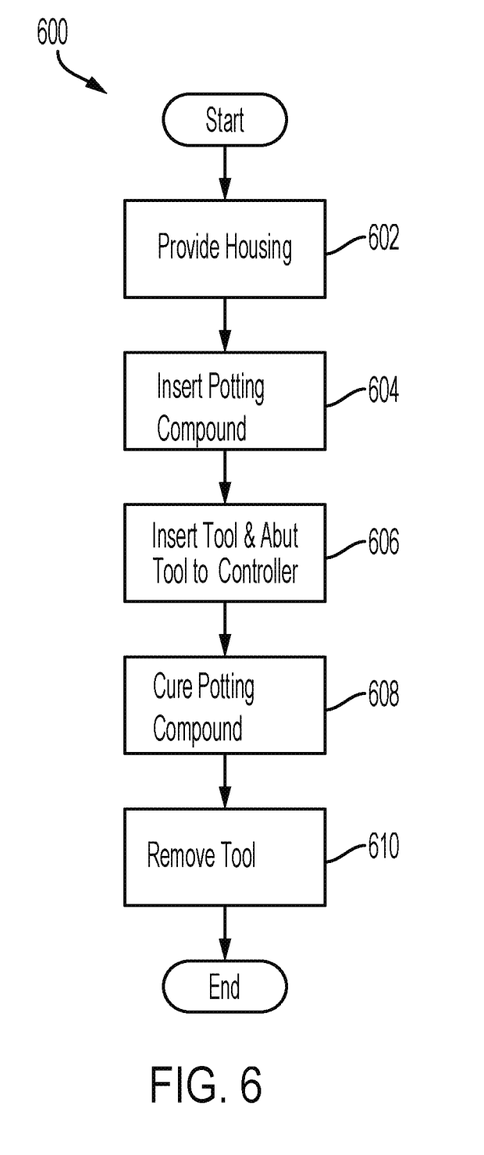
FIG. 6 shows a flowchart of an exemplary process for potting a portion of a cavity of the actuator.

With reference to FIG. 6, FIG. 6 is a diagram of an example process 600 for potting a cavity 110 including a controller 400. The process 600 disclosed herein includes exemplary steps executed in an exemplary order. However, it is to be understood that the process 600 may include fewer steps and/or the steps may be executed in a different order. The process 600 can be executed by an operator during a manufacturing process.

The process 600 begins in a block 602. In the block 602, a housing 102 of an actuator 100 is provided. A hub 352 is inserted into the cavity 110 and a controller 400 is inserted into the cavity 110. The controller 400 is supported by the hub 352 in the cavity 110, as discussed above. The process 600 continues in a block 604.

In the block 604, potting compound 182 is inserted into the cavity 110. A predetermined volume of potting compound 182 may be inserted into the cavity 110. The predetermined volume may be determined to correspond to a desired volume of the portion of the cavity 110 to be filled. The process 600 continues in a block 606.

In the block 606, a tool is inserted into the cavity 110. The tool may be arranged coaxially with the axis A. The tool may be inserted until the tool contacts the circuit board 412*c* around the sensor 414*b*. The tool is configured to circumferentially surround the sensor 414*b* on the circuit board 412*c*. The tool is configured to direct the potting compound 182 away from the sensor 414*b*, as discussed above. The process 600 continues in a block 608.

In the block 608, the potting compound 182 is cured, e.g., according to known techniques. The process 600 continues in a block 610.

In the block 610, the tool is removed from the cavity 110. A shaft 154, e.g., supporting the encoder magnet 368*b*, can be inserted into a recess 140 formed in the potting compound 182 by the tool. The process 600 ends following the block 610.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LISTING OF REFERENCE CHARACTERISTICS 100 actuator
102 housing
104 first end
106 second end
108 wall
110 cavity
122 opening
124 cable
126 cable gland
140 recess
154 shaft
182 potting compound
300 motor
308 shaft
352 hub
358 outer surface
360 first portion
362 second portion
364 groove
400 controller
402 supports
416 computer
368a encoder magnet
368b encoder magnet
412a, 412b, 412c circuit boards
414a, 414b sensors
A, R axis

What is claimed is:

1. An actuator, comprising:
    a housing having a first end and a second end and defining a cavity;
    a hub disposed in the cavity between the first end and the second end of the housing;
    a controller disposed in the cavity and supported by the hub; and
    potting compound surrounding the controller within the cavity;
    wherein the hub includes a first portion abutting the housing and configured to radially constrain the hub in the cavity and a second portion extending axially from the first portion and radially spaced from the housing and supporting the controller; and
    wherein the potting compound fills an entire cross-sectional region of the cavity that includes the controller along an axial length thereof, and fills the cavity between the housing and the second portion and the controller.

2. The actuator of claim 1, wherein the potting compound fills an annular region between the second portion and the housing to radially constrain the second portion in the cavity.

3. The actuator of claim 2, wherein the second portion includes a groove extending radially inward from an outer surface of the second portion, the potting compound filling the groove.

4. The actuator of claim 3, wherein the potting compound is configured to axially constrain the hub in the cavity via the groove.

5. The actuator of claim 1, wherein the potting compound is configured to prevent movement of the hub relative to the housing.

6. The actuator of claim 1, further comprising a cable gland extending through an opening in the housing and a portion of a cable extending through the cable gland into the cavity, wherein the potting compound covers the cable gland and the portion of the cable in the cavity.

7. The actuator of claim 6, wherein the potting compound is configured to seal the cable gland to the housing and the cable within the cavity.

8. The actuator of claim 6, wherein the potting compound is configured to retain the portion of the cable in the cavity.

9. The actuator of claim 1, further comprising a shaft extending outwardly from the cavity, wherein the potting compound is spaced from the shaft.

10. The actuator of claim 9, further comprising an encoder magnet supported by the shaft, wherein the potting compound is radially spaced from the encoder magnet.

11. The actuator of claim 10, wherein the potting compound is axially spaced from the encoder magnet.

12. The actuator of claim 9, wherein the controller includes a sensor, the potting compound covering the sensor, and the sensor being configured to detect a position of the shaft through the potting compound.

13. The actuator of claim 1, wherein the potting compound is configured to adhere to the hub.

14. The actuator of claim 1, wherein the controller includes a plurality of circuit boards axially spaced from each other, the potting compound filling the cavity between the circuit boards.

15. The actuator of claim 1, wherein the potting compound is configured to seal the cavity around the controller.

16. The actuator of claim 1, wherein the hub is coextensive with the housing along an entire axial length of the hub.

* * * * *